Patented June 10, 1930

1,763,216

UNITED STATES PATENT OFFICE

HANS T. BUCHERER, OF MUNICH, GERMANY, ASSIGNOR TO GENERAL ANILINE WORKS, INC., OF NEW YORK, N. Y., A CORPORATION OF DELAWARE

2.3-BENZOCARBAZOLE-1.4-QUINONES AND PROCESS OF PREPARING THE SAME

No Drawing. Application filed June 26, 1928, Serial No. 288,527, and in Germany June 3, 1926.

My present invention relates to 2.3-benzocarbazole-1.4-quinones and process of preparing them.

It is known that the azo dyestuffs of the aryl-β-naphthylamine series are easily transformed into the corresponding azines by hydrolysis.

Since the 2.3-benzocarbazoles of the general formula:

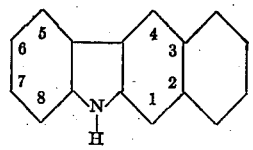

can be regarded as derivatives of the aryl-β-naphthylamines, it could be assumed that also the azo dyestuffs of the 2.3-benzocarbazole series of the general formula:

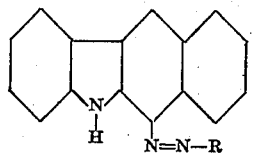

and derivatives thereof would undergo a similar transformation when heated to boiling temperature.

Now I have found that by heating the azo dyestuffs of the 2.3-benzocarbazole series of the general formula:

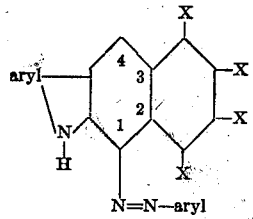

wherein X stands for any substituent, particularly by heating the bisulfite-addition products of these substances with a dilute inorganic or organic acid, as for instance sulfuric acid, hydrochloric acid, oxalic acid or the like, the reaction takes quite another course. It is a surprising fact that there are thus obtained carbazole derivatives of the following general formula, all the nitrogen of the azo group being split off:

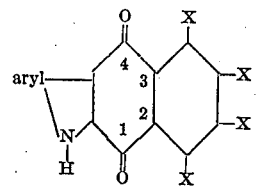

These carbazole derivatives are at the same time derivatives of naphthoquinone. They can, as it had to be expected, easily be transformed into vats and can in fact be used as vat dyestuffs owing to their affinity to the textile fiber.

As regards the preparation of the azo dyestuffs of the 2.3-benzocarbazole series we have found that, instead of directly coupling a diazonium compound with the corresponding carbazole, these important intermediate products can also be obtained in another way, namely by starting from the condensation products obtainable by the action of an aryl-hydrazine-bisulfite mixture upon an azo dyestuff of β-napthylamine or β-naphthol. These condensation products have the following probable formula:

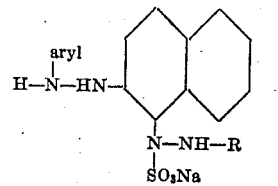

They are for the most part intensely yellow, well crystallized compounds, more or less readily soluble in water, which can be transformed on the one hand into the corresponding arylhydrazino-azo dyestuffs by heating them with an alkali, on the other hand, probably by way of the 2.3-benzocarbazole-azo dyestuffs, into the carbazoles of α-naphthoquinone, i. e. into 2.3-benzocarbazole-1.4-quinones by heating them with a dilute acid. The probable course of the reaction may be illustrated by the following structural formulæ, the correctness of which has, however, not yet been ascertained:

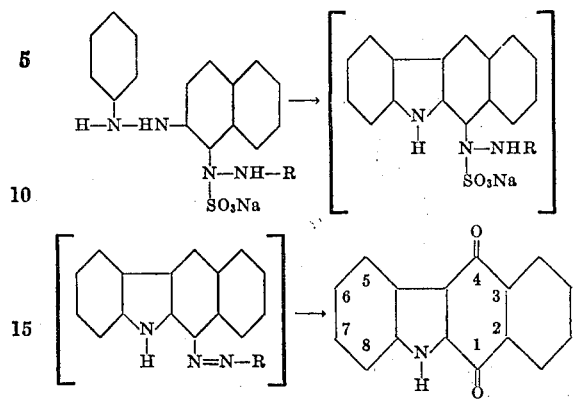

The following examples are intended to illustrate the invention and not to be in any way limiting:

1. The azo dyestuff obtainable by coupling 2.3-benzocarbazole with diazo-sulfanilic acid is at first transformed by the action of bisulfite into the corresponding bisulfite-addition product and then boiled with a considerable excess of acid. There is thus obtained according to the reaction conditions a varying mixture of regenerated azo dyestuff and of 2.3-benzocarbazole-1.4-quinone which latter can easily be separated from the unaltered azo dyestuff owing to its insolubility in ammonia. The unaltered azo dyestuff can again be transformed into the α-naphthoquinone derivative after repeating the addition of bisulfite. α-naphthoquinone may also be obtained from the unaltered azo dyestuff without the addition of bisulfite.

As the azo dyestuffs of the carbazoles are apparently formed as intermediate products during the action of dilute acids upon the condensation products from an azo dyestuff and an aryl-hydrazine in presence of bisulfite, the 2.3-benzocarbazole-1.4-quinones may also be prepared in another, and for the most part simpler manner as described in the following example.

2. 10 grams of the yellow dyestuff, obtainable by the action of the mixture of phenylhydrazine and bisulfite upon the azo dyestuff from diazotized sulfanilic acid and β-naphthol, are heated on the water bath or in a reflux apparatus together with dilute hydrochloric acid or dilute sulfuric acid until the starting material has disappeared and 2.3-benzocarbazole-1.4-quinone has been formed in its place.

The products obtainable according to the two preceding examples are identical and correspond as regards their properties to the oxidation product of pheno-2.3-naphthocarbazole melting at 307° C. which has been described by Graebe and Knecht in "Annalen der Chemie" Volume 202, page 13.

3. The yellow intermediate product, obtainable by causing the azo dyestuff from diazotized sulfanilic acid and β-naphthol to react with asymmetric metaxylylhydrazine and bisulfite, is heated for some hours to boiling with dilute hydrochloric acid or sulfuric acid in the manner described in the preceding example. The dyestuff thus obtained, namely the 2.3-benzo-6.8-dimethylcarbazole-1.4-quinone is purified in the usual manner. It crystallizes in the form of orange-red needles melting at over 300° C. It dissolves in sulfuric acid to a blue solution and yields a vat of a yellow coloration.

4. The yellow intermediate product obtainable by causing the azo dyestuff from diazotized sulfanilic acid and β-naphthol to react with β-naphthylhydrazine and bisulfite is heated to boiling for several hours in a reflux apparatus together with sulfuric acid of about 50 per cent strength. The filtered crude dyestuff which is the 2.3-5.6-dibenzocarbazole-1.4-quinone, is purified by revatting it. The purified dyestuff melts at over 300° C. It is soluble in concentrated sulfuric acid to a blue solution and yields an orange vat.

The yield of 2.3-benzocarbazole-1.4-quinones obtainable according to these examples depends among other things upon the concentration of the acid. There may for instance be used sulfuric acid of 50 per cent strength or hydrochloric acid of 25 per cent strength or other acids in other dilutions.

Instead of the azo dyestuff from sulfanilic acid and β-naphthol used in Examples 2, 3 and 4 other azo dyestuffs may be used, for example such in which substituted β-naphthols have been used instead of β-naphthol, so that it is possible by the process described in the said examples to prepare by synthesis quite generally 2.3-benzocarbazole-1.4-quinones or substitution products thereof.

I claim:

1. In a process of preparing a 2.3-benzocarbazole-1.4-quinone, the step which comprises heating a compound of the following general formula:

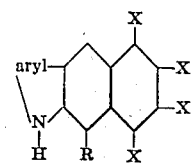

wherein X stands for any monovalent substituents and R for the group —N=N—aryl or —N—NH—aryl (Y being a sulfo group), 
with a dilute acid.

2. In a process of preparing a 2.3-benzocarbazole-1.4-quinone, the step which comprises heating a compound of the following general formula:

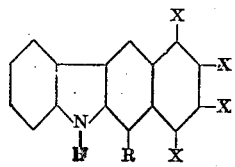

wherein X stands for any monovalent substituents and R for the group —N=N—aryl or —N—NH—aryl (Y being a sulfo group),
$\quad\;\;|$
$\quad\;\;Y$
with a dilute inorganic acid.

3. In a process of preparing a 2.3-benzocarbazole-1.4-quinone, the step which comprises heating a compound of the following general formula:

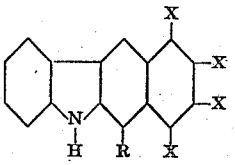

wherein X stands for any monovalent substituents and R for the group —N=N—aryl or —N—NH—aryl (Y being a sulfo group),
$\quad\;\;|$
$\quad\;\;Y$
with an excess of dilute sulfuric acid to boiling.

4. In a process of preparing a 2.3-benzocarbazole-1.4-quinone, the step which comprises heating a compound of the following general formula:

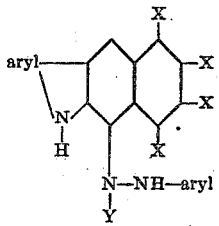

wherein X stands for any monovalent substituents and Y for a sulfo group, with a dilute acid.

5. In a process of preparing a 2.3-benzocarbazole-1.4-quinone, the step which comprises heating a compound of the following general formula:

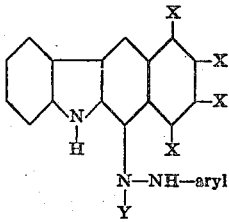

wherein X stands for any monovalent substituents and Y for a sulfo group, with a dilute inorganic acid.

6. In a process of preparing a 2.3-benzocarbazole-1.4-quinone, the step which comprises heating a compound of the following general formula:

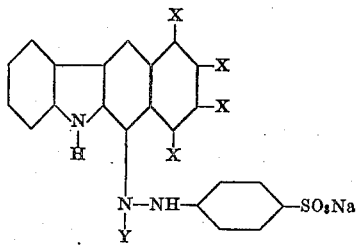

wherein X stands for any monovalent substituents and Y for a sulfo group, with an excess of dilute sulfuric acid to boiling.

7. A process of preparing a 2.3-benzocarbazole-1.4-quinone which consists in heating with a dilute acid the product of the following probable formula:

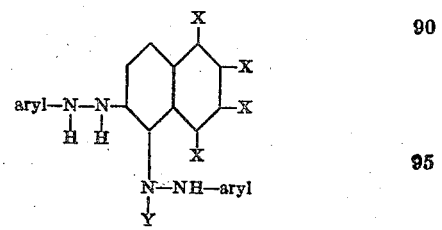

wherein X stands for any monovalent substituent and Y for a sulfo group.

8. A process of preparing 2.3-benzocarbazole-1.4-quinone which consists in heating with a dilute inorganic acid the product of the following probable formula:

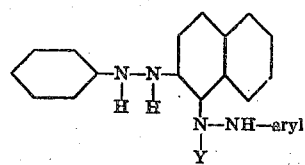

wherein Y stands for a sulfo group.

9. A process of preparing 2.3-benzocarbazole-1.4-quinone which consists in heating the product, obtainable by the action of a phenylhydrazine-bisulfite mixture upon the azo dyestuff from diazotized sulfanilic acid and β-naphthol, of the following probable formula:

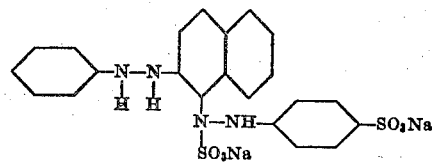

with dilute sulfuric acid on the water bath until the starting material has disappeared.

10. As a new product, the compound of the following formula:
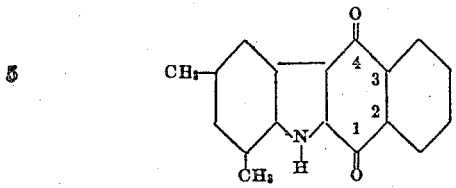
crystallizing in the form of orange-red needles melting at over 300° C., dissolving in sulfuric acid to a blue solution and yielding a yellow vat.
In testimony whereof, I affix my signature.
HANS TH. BUCHERER.